Patented Aug. 7, 1945

2,380,925

UNITED STATES PATENT OFFICE 2,380,925

PLASTICIZED POLYVINYL ACETAL

La Verne E. Cheyney, Akron, Ohio, assignor to Wingfoot Corporation, Akron, Ohio, a corporation of Delaware No Drawing. Application October 21, 1942, Serial No. 462,819

7 Claims. (Cl. 260—36)

This invention relates to the use of plasticizers in polyvinyl acetal compositions. Polyvinyl acetals are formed by the condensation of an aldehyde with a partially hydrolyzed polyvinyl ester, such as polyvinyl acetate or polyvinyl butyrate or polyvinyl propionate, etc.

The plasticizers used according to this invention are amides formed by the condensation of an amine with a higher monocarboxylic fatty acid; that is, a fatty acid which contains at least five carbon atoms besides that in the carboxyl group. The acid may, for example, contain as many as thirty carbon atoms. In forming the acyl amide, the acid may be reacted with ammonia, a primary or secondary aliphatic amine, or a polyalkylene polyamine. The preferred plasticizers are the amides produced from polyalkylene polyamides.

The effect of the plasticizer is illustrated in the following table which compares the properties of certain plasticized films about .002 inch thick with two different controls. The first control is a polyvinyl butyral resin, which contains no plasticizer, and the second control contains dibutyl sebacate as a plasticizer. The second comparison is given to show the differences in a polyvinyl acetal plasticized with a usual ester plasticizer and the same polyvinyl acetal plasticized with this plasticizer and containing an acyl amide in addition.

*Stress-strain properties of plasticized films*

| Plasticizer (parts: 100 resin) | Load at— | | Ultimate | |
|---|---|---|---|---|
| | 20% elong., kg./cm.² | 100% elong., kg./cm.² | Tensile strength, kg./cm.² | Elongation, percent |
| None (control film) | 370 | | 370 | 32 |
| 20 n-caproamide | 39 | 87 | 135 | 180 |
| 20 amide of capric acid and tetraethylene pentamine (1 mole:1 mole) | 109 | 164 | 310 | 180 |
| 20 amide of lauric acid and tetraethylene pentamine (1 mole:1 mole) | 26 | 95 | 302 | 210 |
| 20 amide of myristic acid and triethylene tetramine (1 mole:1 mole) | 85 | 131 | 372 | 210 |
| 20 amide of stearic acid and tetraethylene pentamine (1 mole:1 mole) | 85 | 141 | 282 | 190 |
| 20 dimethyl stearamide | 2 | 9 | 118 | 240 |
| 10 dibutyl sebacate (control film) | 147 | 166 | 238 | 200 |
| 10 dibutyl sebacate +10 stearamide | 134 | 140 | 212 | 162 |
| 10 dibutyl sebacate +10 n-amyl stearamide | 12 | 62 | 176 | 180 |
| 20 oleic amide | 81 | 136 | 322 | 220 |
| 20 n-amyl oleamide | 49 | 122 | 285 | 200 |

The effect of the plasticizer is to decrease the load required to produce any given elongation and to decrease the ultimate tensile strength. The ultimate elongation is increased. Other effects of the plasticizers are increased flexibility, resistance to cutting and tearing, improved shock resistance, etc. The plasticizers may be used in amounts all the way from 5 per cent up to 50 per cent. Other plasticizers which may be used include pelargonamide, capramide, lauramide, tridecylamide, palmitamide, myristamide, etc., as well as their mono- and di-nitrogen substituted derivatives.

The acyl amides are quite compatible with the polyvinyl acetals. In general, compatibility is increased by shortening the chain of the acyl amide or introducing unsaturated linkages. In some cases it may be found desirable to add a different plasticizer, such as dibutyl sebacate or another compounding material to render the polyvinyl butyral and the plasticizer more compatible.

These plasticizers may be employed in the formulation not only of cast films but of other plastic compositions where flexibility, softness, resistance to tear, resilience, impact strength, etc., are desirable. Such compositions might advantageously be coatings applied to sheet materials, such as cloth or paper, extruded products or molding compositions.

Films of the thickness indicated may be employed for the fabrication of packages or for fashioning garments, such as raincoats, or other products, such as shower curtains, umbrellas, etc. Coated fabrics or paper in which the coating composition contains a polyvinyl acetal resin plasticized with one of the amides of this invention are especially useful for the fabrication of water-proof materials which may be used for some of the same uses as those indicated for the films and which possess additional strength because of the backing to which the coating is applied. Extruded products may take the form of flexible tubing or of calendered sheet material which is an extremely valuable safety-glass interlayer because of its excellent low temperature properties. Molded products of the compositions indicated by this invention are useful substitutes for rubber goods because of their resilience and elasticity.

Where resistance to the passage of gases is desired, twenty parts of n-caproamide or twenty parts of the amide from a polyalkylene polyamine and a fatty acid, such as the amide from tetraethylene pentamine and lauric acid are recommended. Tests for the rate of hydrogen gas diffusion of polyvinyl acetals plasticized with these particular amides showed the rate to be practically the same as that of an unplasticized control film. Films plasticized with corresponding amounts of normal ester plasticizers, such as dibutyl phthalate and dibutyl sebacate, give gas diffusion rates considerably higher than that of the unplasticized control film.

What I claim is:

1. A polyvinyl acetal composition plasticized with an amide formed by equal molar proportions of a polyalkylene polyamine and a monocarboxylic fatty acid, said acid containing about five to about thirty carbon atoms.

2. A polyvinyl butyral composition plasticized with the amide of equal molar proportions of tetraethylene pentamine and a monocarboxylic fatty acid, said acid containing about 5 to about 30 carbon atoms.

3. A polyvinyl butyral composition plasticized with an amide formed of equal molar proportions of tetraethylene pentamine and lauric acid.

4. A sheet material coated with a polyvinyl acetal composition which is plasticized with an amide formed of equal molar proportions of a polyalkylene polyamine and a monocarboxylic fatty acid, said acid containing from 5 to about 30 carbon atoms.

5. A sheet material coated with a polyvinyl butyral composition plasticized with the amide of equal molar proportions of tetraethylene pentamine and a monocarboxylic fatty acid, said acid containing from 5 to about 30 carbon atoms.

6. A sheet material coated with a polyvinyl butyral composition plasticized with the amide of equal molar proportions of tetraethylene pentamine and lauric acid.

7. A sheet material coated with a polyvinyl butyral composition plasticized with the amide of equal molar proportions of a polyalkylene polyamine and a monocarboxylic fatty acid, said acid containing from about 5 to about 30 carbon atoms.

LA VERNE E. CHEYNEY.

CERTIFICATE OF CORRECTION.

Patent No. 2,380,925.     August 7, 1945.

LA VERNE E. CHEYNEY.

It is hereby certified that error appears in the printed specification of the above numbered patent requiring correction as follows: Page 1, first column, line 18, for "polyamides" read --polyamines--; and that the said Letters Patent should be read with this correction therein that the same may conform to the record of the case in the Patent Office.

Signed and sealed this 13th day of November, A. D. 1945.

Leslie Frazer (Seal)     First Assistant Commissioner of Patents.

mended. Tests for the rate of hydrogen gas diffusion of polyvinyl acetals plasticized with these particular amides showed the rate to be practically the same as that of an unplasticized control film. Films plasticized with corresponding amounts of normal ester plasticizers, such as dibutyl phthalate and dibutyl sebacate, give gas diffusion rates considerably higher than that of the unplasticized control film.

What I claim is:

1. A polyvinyl acetal composition plasticized with an amide formed by equal molar proportions of a polyalkylene polyamine and a monocarboxylic fatty acid, said acid containing about five to about thirty carbon atoms.

2. A polyvinyl butyral composition plasticized with the amide of equal molar proportions of tetraethylene pentamine and a monocarboxylic fatty acid, said acid containing about 5 to about 30 carbon atoms.

3. A polyvinyl butyral composition plasticized with an amide formed of equal molar proportions of tetraethylene pentamine and lauric acid.

4. A sheet material coated with a polyvinyl acetal composition which is plasticized with an amide formed of equal molar proportions of a polyalkylene polyamine and a monocarboxylic fatty acid, said acid containing from 5 to about 30 carbon atoms.

5. A sheet material coated with a polyvinyl butyral composition plasticized with the amide of equal molar proportions of tetraethylene pentamine and a monocarboxylic fatty acid, said acid containing from 5 to about 30 carbon atoms.

6. A sheet material coated with a polyvinyl butyral composition plasticized with the amide of equal molar proportions of tetraethylene pentamine and lauric acid.

7. A sheet material coated with a polyvinyl butyral composition plasticized with the amide of equal molar proportions of a polyalkylene polyamine and a monocarboxylic fatty acid, said acid containing from about 5 to about 30 carbon atoms.

LA VERNE E. CHEYNEY.

CERTIFICATE OF CORRECTION.

Patent No. 2,380,925.  August 7, 1945.

LA VERNE E. CHEYNEY.

It is hereby certified that error appears in the printed specification of the above numbered patent requiring correction as follows: Page 1, first column, line 18, for "polyamides" read --polyamines--; and that the said Letters Patent should be read with this correction therein that the same may conform to the record of the case in the Patent Office.

Signed and sealed this 13th day of November, A. D. 1945.

Leslie Frazer (Seal)  First Assistant Commissioner of Patents.